April 23, 1929. J. W. PELPHREY 1,710,590
VACUUM HEAD
Filed May 8, 1924
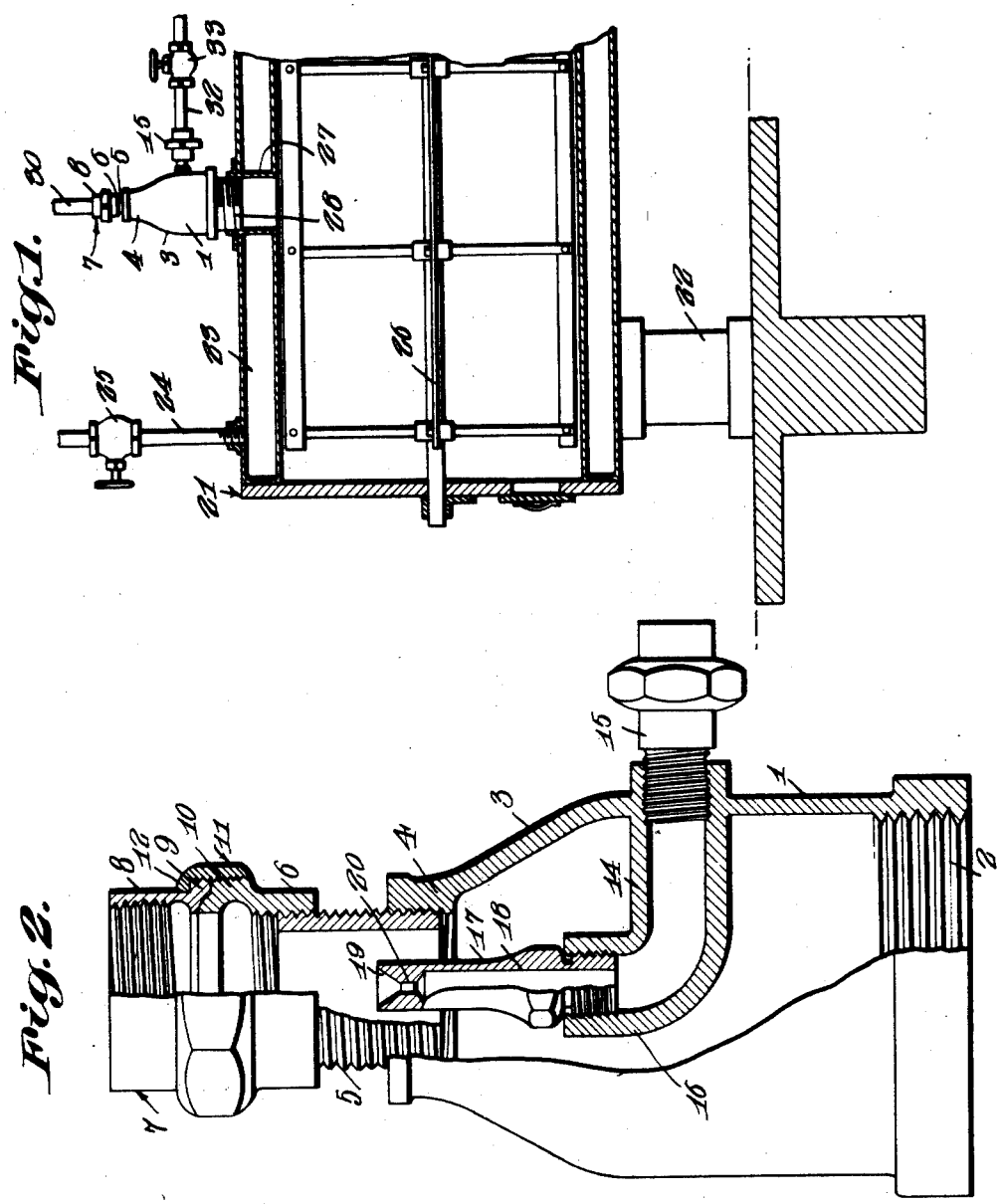
J.W.Pelphrey, Inventor
By C.A.Snow&Co.
Attorney Patented Apr. 23, 1929.

1,710,590

UNITED STATES PATENT OFFICE.

JESSE W. PELPHREY, OF LOS ANGELES, CALIFORNIA; A. W. PELPHREY ADMINISTRATOR OF SAID JESSE W. PELPHREY, DECEASED.

VACUUM HEAD.

Application filed May 8, 1924. Serial No. 711,922.

This invention aims to provide a simple but efficient means whereby the vapor or gas may be extracted, by the use of a jet of compressed air, from a dryer, the vapor or gas being deodorized.

It is within the province of the disclosure to improve generally and to enhance the utility of devices of that kind to which the invention appertains.

Although a preferred embodiment of the invention has been made the subject of illustration, it will be understood that a mechanic, working within the scope of what is claimed, may make changes in the precise structure shown, without in anywise departing from the spirit of the invention.

In the drawings:—Figure 1 shows in longitudinal section, a portion of a dryer wherewith the device forming the subject matter of this application has been assembled; Figure 2 is sectional view of the device per se, parts being in elevation.

The device forming the subject matter of this application is adapted to be used with any kind of a dryer employed in the manufacture of fertilizer, brewer's grain, potter's clay or any other product. As depicted in Figure 1, the dryer comprises a tubular body 21, supported at 22 and provided with a jacket 23 whereinto steam is admitted through a pipe 24 provided with a valve 25, an agitator 26 being journaled in the dryer. A sleeve 27 forms an outlet for the vapor driven off in the drying process, a coupling 28 being threaded into the sleeve 27.

The device shown in Figure 2 includes a body 1 which is internally threaded at 2 for engagement with the coupling 28, the body having a tapered end 3 terminating in a neck 4, a nipple 5 being threaded into the neck. The nipple 5 is threaded into one member 6 of a coupling 7, the other member of the coupling being denoted by the numeral 8 and having an outstanding flange 9. There is an outstanding flange 10 on the member 6 of the coupling, a ring 11 being threaded on the flanges 9 and 10 and having a lip 12 which overlaps the flange 9 to hold the members 6 and 8 of the coupling together. The member 8 of the coupling is united with a pipe 30 through which the vapor proceeding from the dryer is discharged. An air inlet conduit 14, preferably in the form of an elbow, is formed integrally with the body 1 and includes an end or arm 16 disposed in the axis of the body 1, a nozzle 17 being threaded into the end 16 of the elbow. The nozzle 17 has a bore 18 communicating with the conduit 14 and has a flared mouth 19 communicating with the nipple 5, the nozzle being provided with a reduced duct 20 connecting the bore 18 with the mouth 19. A union 15 is assembled with the outer end of the air inlet conduit 14 and is connected to an air pressure pipe 32 wherein a valve 33 is interposed. The body 1 and parts at the upper end thereof may be alluded to as a casing into which the air conduit 14 extends, and into which the nozzle 17 discharges, axially of the casing.

In practical operation, air under pressure passes through the pipe 32, the member 14 and the nozzle 17 and carries away the vapor derived from the product during the heating thereof, the vapor being carried out of the body of the dryer.

I claim:—

A device of the class described comprising a cylindrical body, one end of which is threaded to form a pipe connection, the said end of the body being open throughout its entire cross section, the body being provided at its opposite end with a tapered portion terminating in a neck, a nipple threaded into the neck, a one-piece air conduit integral with the body and comprising an arm terminating within the tapered portion of the body and located axially with respect to the nipple and to the body, the air conduit opening through the cylindrical part of the body and being located immediately adjacent to the wider part of the tapered portion of the body, a nozzle connected at its inner end, detachably, to the aforesaid arm of the conduit, the nozzle extending into the nipple to a point approximately flush with the outer end of the neck, the nozzle having a reduced duct, and having a flared mouth discharging into the nipple, the nozzle having a bore which is in communication with the mouth, the bore communicating with the conduit, and the duct establishing communication between the bore and the mouth.

In testimony that I claim the foregoing as my own, I have hereto affixed my signature.

JESSE W. PELPHREY.